Figure 2A:
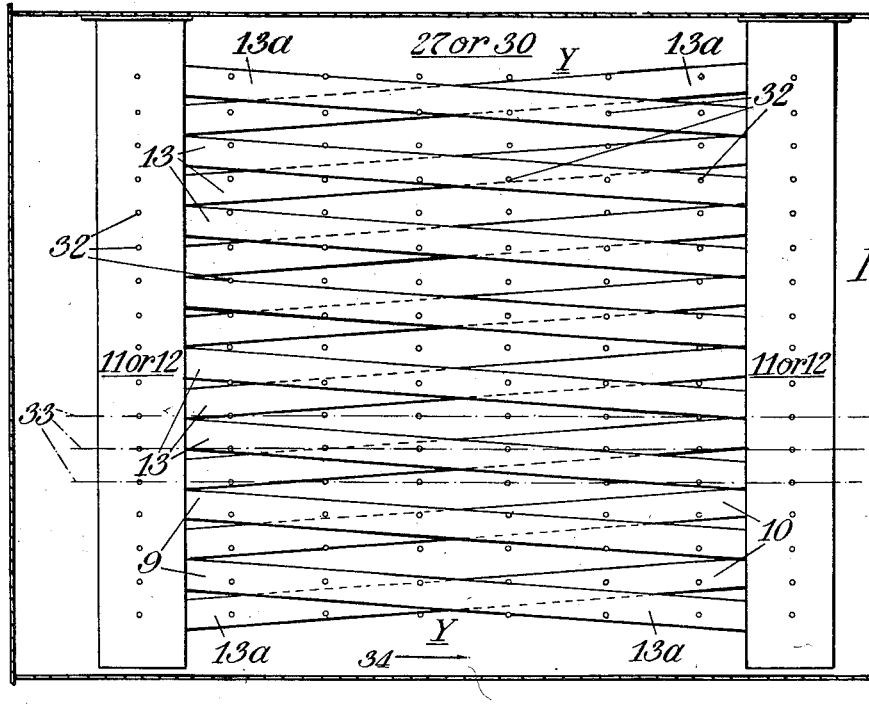

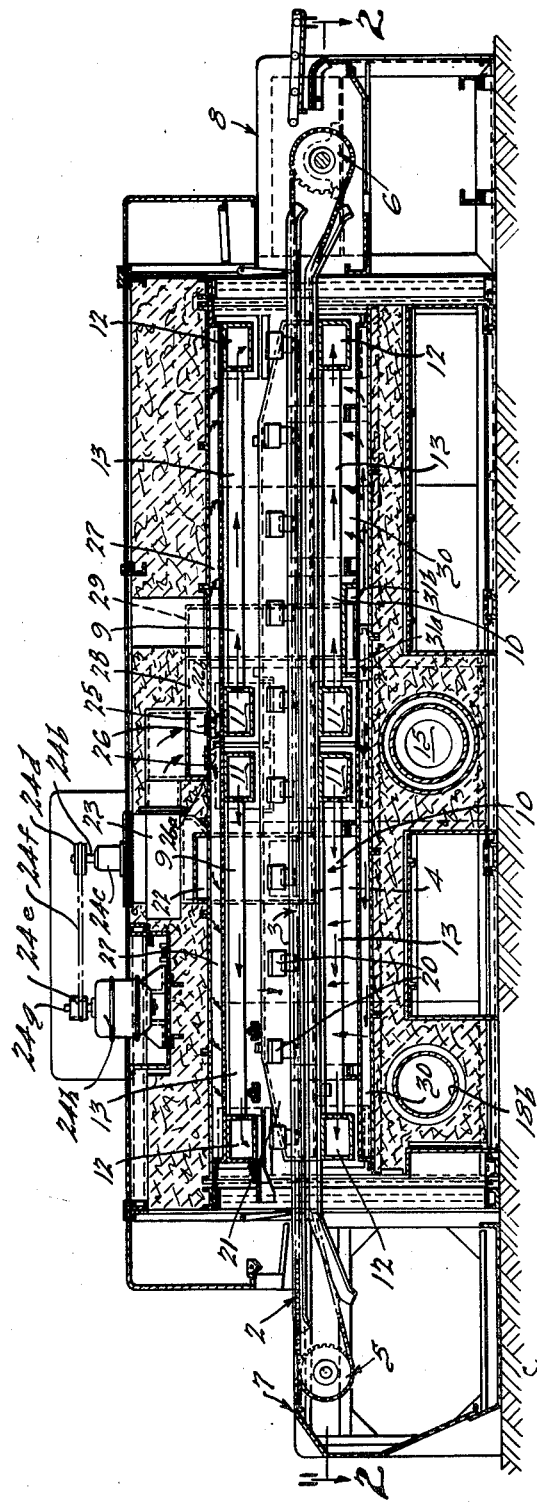

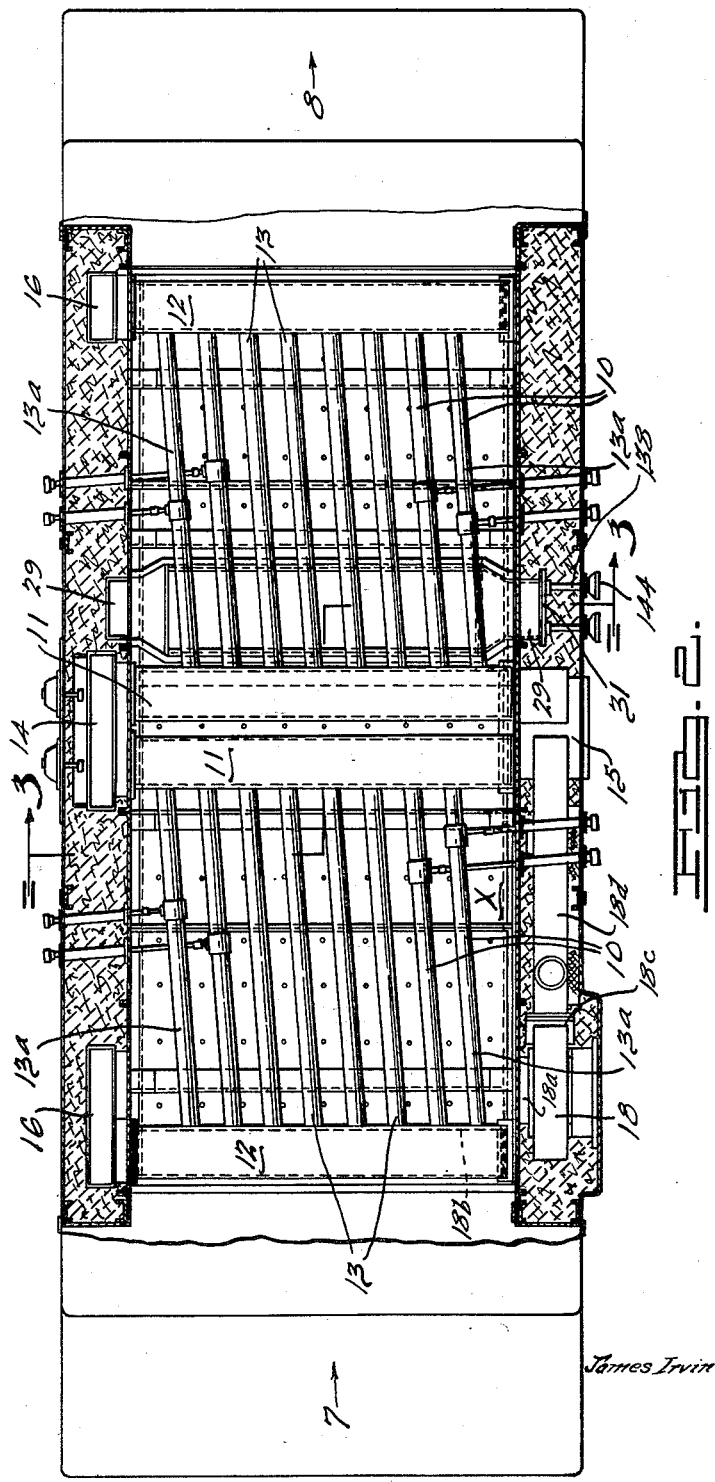

March 15, 1955  J. I. D. WARRINGTON  2,704,040
BAKING OVENS
Filed June 17, 1952  4 Sheets-Sheet 3

INVENTOR
James I. D. Warrington.
BY
Harness, Dickey & Pierce
ATTORNEYS.

March 15, 1955  J. I. D. WARRINGTON  2,704,040
BAKING OVENS
Filed June 17, 1952  4 Sheets-Sheet 4

INVENTOR.
James Irvine Dudley Warrington.

United States Patent Office 2,704,040
Patented Mar. 15, 1955

2,704,040

BAKING OVENS

James Irvine Dudley Warrington, Peterborough, England, assignor to Baker Perkins Inc., Saginaw, Mich., a corporation of New York Application June 17, 1952, Serial No. 293,980

12 Claims. (Cl. 107—57)

This invention relates to baking ovens, more especially of the travelling conveyor type, used for example for baking bread, confectionery, i. e. small cakes, tarts and the like, and biscuits.

In British patent specification No. 555,947 there is described and claimed in a travelling conveyor oven having indirect heating means within the baking chamber comprising radiator means containing a heating medium which is isolated from the baking chamber, the provision of means for applying direct blasts of oven atmosphere onto the material being baked.

The provision of means for applying direct blasts of oven atmosphere onto the material being baked is there described and shown as taking place across a small longitudinal section only of the baking chamber.

It has now been found that by extending this principle to the whole of the baking chamber, it is possible to achieve a shorter baking time and more even baking throughout the width of the chamber, with resulting improved appearance of the goods and reduced fuel costs.

It has also been found that by inclining the radiant heating tubes described and shown in British patent specification No. 555,947 or in British patent specification No. 391,128, the attainment of some or all of the above-mentioned advantages is assisted.

The invention consists of a baking oven of the travelling conveyor type having means for abstracting some of the heated oven atmosphere from the baking chamber and redistributing it to the baking chamber through orifices located to discharge over substantially the whole area of the run of the conveyor.

The invention further consists of a baking oven of the travelling conveyor type having indirect heating means within the baking chamber comprising indirect heating means located both above and below the run of the conveyor and containing heating means or a heating medium which is isolated from the baking chamber, in which means are provided for abstracting some of the oven atmosphere from the baking chamber and redistributing it to the baking chamber through orifices located both above and below the indirect heating means to discharge therethrough over substantially the whole area of the run of the conveyor lying between the indirect heating means. By this arrangement the air discharged through said orifices is heated up by contact with indirect heating means before reaching the goods on the conveyor.

The invention still further consists of a baking oven of the travelling conveyor type having indirect heating means within the baking chamber and containing heating means or a heating medium which is isolated from the baking chamber in which the indirect heating means are in the form of spaced tubes extending generally in the direction of the run of the conveyor but inclined in the horizontal plane in relation to said direction.

According to the invention it is preferred to provide two sets of parallel spaced tubes, an upper set above and a lower set below the run of the conveyor, and the tubes of the sets are oppositely inclined as viewed in plan in relation to the direction of run of the conveyor.

Further, according to the invention the oven atmosphere abstracted is drawn from both sides of the baking chamber through ducts spaced along the length of the baking chamber and located between the ceiling and the floor of the baking chamber.

Figure 4:
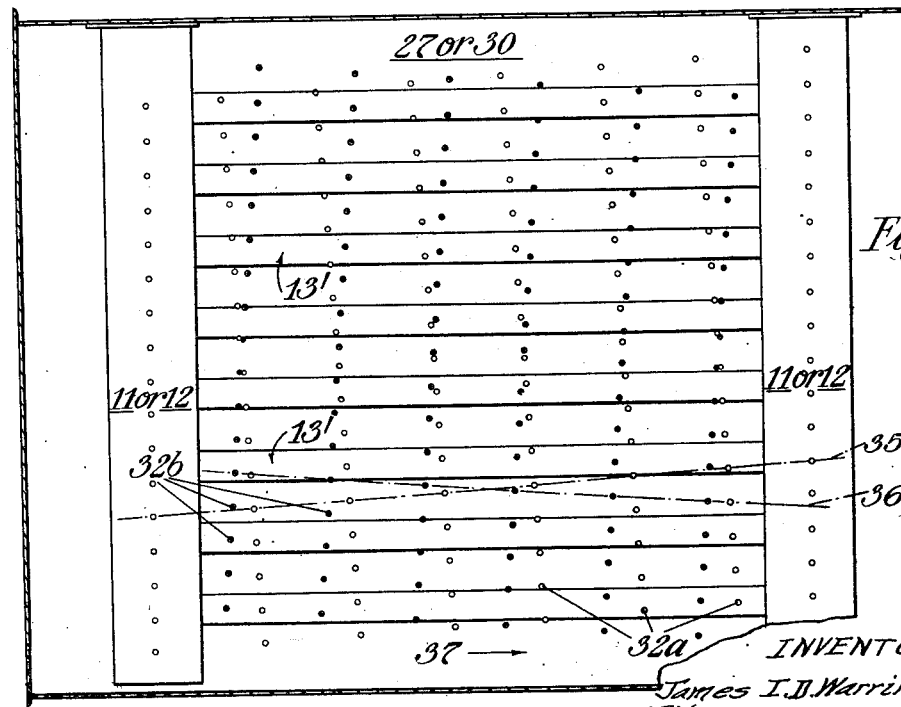
Figure 3:
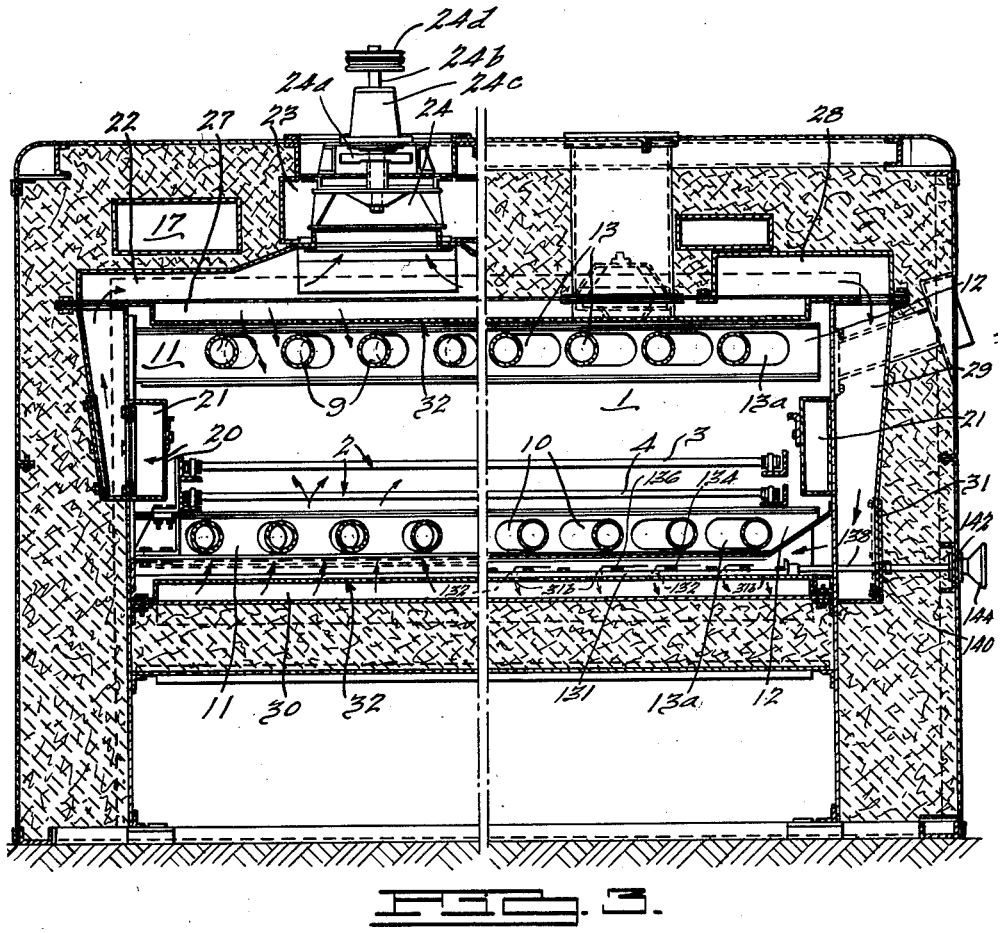
Figure 5A:
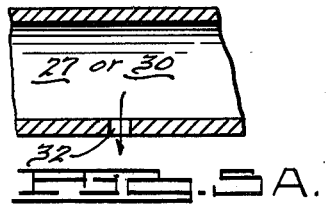
Figure 5B:
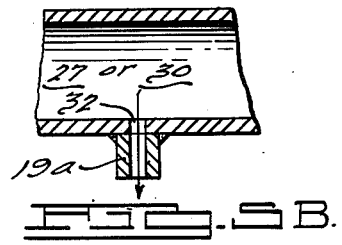
Figure 5C:
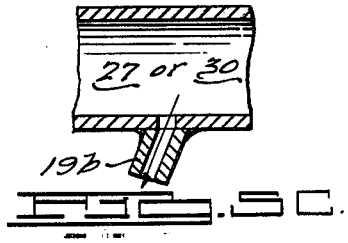

In the accompanying drawings:

Figure 1 is a central sectional side elevation of an oven having heating means according to the present invention, Figure 2 is a sectional plan view of the heating means below the oven band conveyor, taken on the line 2—2 of Figure 1, Figure 2a is a diagrammatic plan view of the heating means shown in Figures 1 and 2, in which the heating means above and below the oven band conveyor are superimposed to show their relationship, Figure 3 is a sectional elevation taken on the line 3—3 of Figure 2, Figure 4 is a diagrammatic plan view of a modified arrangement of the heating means shown in Figure 2a, and Figures 5a, 5b and 5c are detailed fragmentary sectional views of the recirculation orifices for the oven atmosphere.

In carrying the invention into effect according to one convenient mode, by way of example, the oven comprises a baking chamber 1 through which runs a guided rod or other form of continuous conveyor 2 having an upper active run 3 and a return run 4 immediately beneath it, the active run 3 only being used to support the product to be baked all in known manner. The conveyor 2 at each end emerges from the baking chamber and passes around on suitable sets of sprocket wheels 5 and 6 one set of which is driven, goods being loaded at one end 7 and unloaded at the other end 8 of the oven.

Within the baking chamber 1 and above and below the conveyor 2 are provided indirect oven heating means comprising upper and lower sets 9 and 10 of radiant heater units, the number of units in each set depending on the length of the baking chamber, two units per set making four units in all (as shown in the drawings) is a convenient number and is considered here by way of example.

Each unit 9 or 10 comprises an inlet (feed) header 11 extending transversely of the oven and a parallel exhaust header 12 spaced therefrom, the two headers being joined by spaced parallel heater tubes 13 which are inclined (see Figure 2) as viewed in plan in relation to the direction of travel of the conveyor 2. The opposed units of an upper and a lower set 9 and 10 of such heaters are respectively inclined in opposite directions, so that the tubes thereof cross one another when viewed in plan, see Figure 2a.

The inclination of the tubes 13 will vary with the distance between the inlet and exhaust headers 11 and 12 of a unit, in all cases however, the inclination must essentially be such that the rectilinear path of any single article of goods travelling on the conveyor 2 must pass over or beneath the surface of a tube 13. In other words the junction of a tube 13 with one header, say 11, must at least be aligned or preferably overlap the junction of an adjacent tube 13 with the other header 12. Further the dimension of a heater unit 9 or 10 between the center lines of the outermost tubes 13a thereof where they join a header must be substantially the same as the width of the oven conveyor 2, see Figure 3. It will be appreciated that over-inclination of the tubes would result in an undesirably large unheated void in the heater unit laterally outwardly of the outermost tubes 13a thereof, the void being triangular in plan increasing in base from one end of the unit to the other (i. e. the void area X in Figure 2 would be undesirably increased). The use of superposed units i. e. of the upper set 9 and the lower set 10, having oppositely inclined tubes 13 (see Figure 2a) reduces the effective extent of such a void X by filling in part of the triangle towards its base; there still remains however an uneliminated part Y (Figure 2a) of the void also triangular in plan the apex of which is midway of the length of the units. The inclination of the tubes 13 must therefore be such as to reduce the area of such unheated voids X and Y to a minimum.

The inlet headers 11 for the adjacent units of each set 9 or 10 are conveniently located side-by-side with their respective heater tubes 13 extending oppositely away from them (see Figure 1), whereby the headers 11 can be fed with heated gases from an inlet manifold 14 (Figure 2) located to one side of the oven and connected to a heater tube 15 located transversely below the baking chamber 1 and containing a heating element (not shown) e. g. a gas or oil burner. The heated gases pass from the inlet headers 11 towards each end of the baking chamber 1 through the heater tubes 13 and into the exhaust headers 12, which are coupled by manifolds 16 at one side of the oven to an exhaust duct 17 (Figure 3) which conveys the gases back to the heater tube 15, circulation being maintained by a fan or blower 18 in known manner. It will be understood, however, that the direction in which the gas flows through the heater tubes 13 is not critical for the purposes of the present invention. The vertical manifolds 16 are interconnected by the longitudinal ducts 17 and connected to the inlet 18a of the fan 18 by a cross duct 18b which extends transversely of the oven structure, as shown in Figs. 1 and 2. The outlet 18c of the fan 18 is connected to the heater tube 15 by a longitudinal duct 18d.

For the purpose of redistributing some of the oven atmosphere to the baking chamber to impinge on the goods from above and below, according to the present invention the side walls of the baking chamber 1 are each provided with a series of spaced collecting ducts 20 through which oven atmosphere is withdrawn. A manifold 21 on each side of the oven connects the collecting ducts 20 together and the manifolds 21 are connected to the opposite ends of an associated header 22 which conveys the heated air to a turbulence chamber 23 located at the top of the oven structure, in which is provided a driven fan or impeller means 24 for circulating the air through the redistribution system to be described. As shown in Figs. 1 and 3, the impeller means 24 includes a blade element 24a fixed on one end portion of a vertically extending shaft 24b rotatably mounted in a housing 24c secured to the top of the oven structure. A pulley 24d is fixed to the opposite end portion of the shaft 24b and the pulley 24d is driven by a pulley 24e through a belt 24f, the pulley 24e being fixed on the drive shaft 24g of a conventional electric motor 24h mounted on the top portion of the oven structure in spaced relationship to the housing 24c.

The air impelled from the turbulence chamber 23 is received by a distributing trunk 25 extending across the width of the baking chamber 1 and which connects through adjustable damper means 26 and ports 26a and 26b with separate upper air chambers 27 (one for each indirect heater unit 9), located immediately above their associated heater units 9 and extending over the area of said units. The distributing trunk 25 is also connected by a branch duct 28 to down lead ducts 29 for conveying air through ports 31a and 31b to similar lower air chambers 30 located immediately beneath the lower indirect heating units 10, the supply to which is also controlled by damper means 31 in the down lead ducts 29. The damper means 26 and 31 may be substantially identical in construction. As shown in Fig. 3, the damper means 31 comprises a damper slide 131 having openings 132 therein adapted to register with the ports in the associated air chamber, as for example, the ports 31a and 31b. Guide pins 134 are provided which project outwardly from the wall of the air chamber adjacent the damper slide 131 and bear against the edges of the damper slide 131 to maintain the damper slide in the properly aligned position, the guide pins 134 having head portions 136 which serve as abutment stops to prevent vertical movement of the damper slides. A control rod 138 is provided, one end portion of which is fixed to the damper slide 131 while the other end portion of the control rod 138 projects through the wall of the oven, the control rod being mounted for sliding movement in bearing members 140 and 142 carried by the oven structure. A knob 144 is fixed to the outer end of the control rod 138 and the knob 144 may be grasped so as to impart longitudinal movement to the control rod, such movement being effective to move the damper slide relative to the ports in the associated air chamber so as to vary the size of such ports through which the air flows into the associated air chamber. Damper slides are also provided which are similar to the damper slide 131 and which co-act with the ports 26a and 26b in the upper air chambers to vary the size of the ports 26a and 26b through which the air flows into the upper air chambers. The damper slides associated with the ports 26a and 26b are controlled by rods which correspond to the rods 138 and the inner ends of which are fixed to the damper slides associated with the ports 26a and 26b while the outer end portions of such rods project through the wall of the oven, the control rods being mounted for sliding movement in bearing members similar to the bearing members 140 and 142 carried by the oven structure. A knob similar to the knob 144 is fixed to the outer end of each of the rods controlling the damper slides associated with the ports 26a and 26b and such knobs may be grasped so as to impart longitudinal movement to the control rod associated therewith, such movement being effective to move the damper slide relative to the ports in the associated air chamber so as to vary the size of such ports through which the air flows into the associated air chamber.

The air chambers 27 and 30, as stated, extend over substantially the whole area of their associated heater units 9 and 10 and therefore together cover the whole area of the baking chamber 1 and each may conveniently comprise, as illustrated, a flat box having distributed over its face nearest the heater unit a plurality of spaced orifices 32 through which the air from the redistribution system, described above, is caused to issue and impinge on the goods on the conveyor 2. The orifices 32 which may be merely apertures (see Figure 5a) or may be equipped with vertical or inclined nozzles 19a or 19b (see Figures 5b and 5c) are spaced over the surface of the air chamber or box 27 or 30 in longitudinally extending rows 33 parallel with the direction of feed of the conveyor 2 (shown in Figure 2a by the arrow 34), their arrangement preferably being such that the majority of orifices in alternate rows at least are located substantially clear of the tubes 13 of the associated heater unit 9 or 10.

As an alternative to the foregoing description relating to heating units having inclined tubes 13, the indirect heating units may comprise tubes 13' (see Figure 4) which are parallel with the direction of feed of the conveyor 2, in which case the orifices 32a and 32b in the air boxes or chamber 27 or 30 are staggered or, as shown, in inclined rows 35 and 36, whereby any single article of goods travelling on the conveyor 2 in a rectilinear path in the direction of the arrow 37 must pass under (or over) at least one of the air streams emerging from the orifices 32a (or 32b). With the inclined row arrangement of orifices, the relative arrangement of the orifices 32a and 32b respectively in opposed upper and lower air chambers 27 and 30 is such that when viewed in plan (see Figure 4) these rows 35 and 36 are oppositely inclined, the lines of the rows 35 of one chamber 27 intersecting the lines of the rows 36 of the other chamber 30.

The location of the orifices 32, 32a or 32b in the air boxes 27 or 30 being immediately above or below the tubes 13 or 13' of the associated heating units 9 or 10 further ensures that the air discharged from the orifices is heated by passing over the heater tubes before impinging on the goods.

While preferred embodiments of the invention have been shown and described, it will be understood that various changes and modifications may be made without departing from the spirit of the invention.

What is claimed is:

1. An oven comprising a baking chamber containing a traveling conveyer, an air chamber having an inner wall spaced from said conveyer and having a plurality of spaced orifices in the inner wall thereof arranged in aligned rows extending generally in the direction of travel of said conveyer, a plurality of elongated spaced horizontal tube-type radiating heaters interposed between said air chamber and said conveyer and extending generally in the direction of travel of the conveyer, the axes of said tubes and said rows being relatively inclined in a horizontal plane, the spacing between the axes of said rows being less than the spacing between the longitudinal axes of said tubes whereby the majority of orifices in alternate rows are located to coincide with the spaces between adjoining tubes.

2. In an oven provided with a baking chamber having a traveling conveyer, the combination comprising an air chamber in said baking chamber spaced from said conveyer, said air chamber having an inner wall provided with a plurality of spaced orifices located to discharge over substantially the entire area of the run of the conveyer, conduit means connecting said baking chamber with said air chamber, a plurality of spaced headers extending transversely of said baking chamber, and a plurality of spaced horizontal tube-type radiating heaters interposed between said air chamber and said conveyer and extending generally in the direction of the run of the conveyer but inclined in a horizontal plane in relation to said direction, the opposite end portions of said heaters being connected to said headers.

3. In an oven provided with a baking chamber having a traveling conveyer, a plurality of air chambers in said baking chamber disposed above and below said conveyer in spaced relation thereto, said air chambers having inner walls provided with a plurality of spaced orifices located to discharge over substantially the entire area of the run of the conveyer, conduit means connecting said baking chamber with said air chambers, means for proportioning the flow of air to each of said air chambers, and a plurality of spaced horizontal tube-type radiating heaters interposed between said air chambers and said conveyer and extending generally in the direction of the run of the conveyer but inclined thereto to the extent that one end of each heater is displaced laterally from its opposite end by approximately the distance between said heaters, the ends of said heaters terminating within said baking chamber.

4. In an oven provided with a baking chamber having a traveling conveyer, a plurality of air chambers in said baking chamber disposed above and below said conveyer in spaced relation thereto and having inner walls extending for substantially the entire area of the run of the conveyer, the inner walls of said air chambers provided with a plurality of spaced orifices, conduit means including a blower connecting both sides of said baking chamber with said air chambers, means for proportioning the flow of air to each of said air chambers, and a plurality of spaced horizontal tube-type radiating heaters interposed between said air chambers and said conveyer and extending generally in the direction of the run of the conveyer but inclined in a horizontal plane in relation to said direction, the ends of said heaters terminating within said baking chamber, the heaters above said conveyer oppositely inclined with respect to the heaters below said conveyer.

5. An oven comprising a baking chamber containing a traveling conveyer, and a plurality of elongated spaced horizontal tube-type radiating heaters spaced from the conveyer and extending generally in the direction of travel of the conveyer but inclined in a horizontal plane in relation to said direction to the extent that one end of each heater is displaced laterally from its opposite end by a distance substantially equal to the thickness of said heaters.

6. An oven comprising a baking chamber containing a traveling conveyer, and a plurality of elongated spaced horizontal tube-type radiating heaters spaced from the conveyer and extending generally in the direction of travel of the conveyer but inclined thereto to the extent that one end of each heater is displaced laterally from its opposite end by a distance substantially equal to the minimum transverse dimension of said heaters.

7. An oven comprising a baking chamber containing a traveling conveyer, and a plurality of elongated spaced horizontal tube-type radiating heaters disposed above and below said conveyer in spaced relation thereto and extending generally in the direction of travel of the conveyer but inclined thereto to the extent that one end of each heater is displaced laterally from its opposite end by a distance substantially equal to the minimum transverse dimension of said heaters.

8. An oven comprising a baking chamber containing a traveling conveyer, a plurality of headers extending transversely of said baking chamber, and a plurality of elongated spaced horizontal tube-type radiating heaters disposed above and below said conveyer in spaced relation thereto and extending generally in the direction of travel of the conveyer but inclined thereto to the extent that one end of each heater is displaced laterally from its opposite end by approximately the distance between said heaters, the opposite end portions of said heaters being connected to said headers, the heaters above said conveyer oppositely inclined with respect to the heaters below said conveyer.

9. In an oven provided with a baking chamber having a traveling conveyer, a plurality of air chambers in said baking chamber spaced from said conveyer and extending for substantially the entire area of the run of the conveyer, each of said air chambers having an inner wall provided with a plurality of spaced orifices arranged in aligned rows extending generally in the direction of travel of said conveyer but inclined in a horizontal plane in relation to said direction, conduit means including a blower connecting said baking chamber with said air chambers, means for proportioning the flow of air to each of said air chambers, a plurality of headers extending transversely of said baking chamber, and a plurality of spaced horizontal tube-type radiating heaters interposed between said air chambers and said conveyer and extending in a direction substantially parallel to the run of the conveyer, the opposite end portions of said heaters being connected to said headers, the spacing between the axes of said rows of orifices being less than the spacing between the longitudinal axes of said heaters whereby the majority of orifices in alternate rows are located to coincide with the spaces between adjoining heaters.

10. In an oven provided with a baking chamber having a traveling conveyer, a plurality of air chambers in said baking chamber spaced from said conveyer and extending for substantially the entire area of the run of the conveyer, each of said air chambers having an inner wall provided with a plurality of spaced orifices arranged in aligned rows extending generally in the direction of travel of said conveyer but inclined in a horizontal plane in relation to said direction, conduit means including a blower connecting said baking chamber with said air chambers, means for proportioning the flow of air to each of said air chambers, a plurality of headers extending transversely of said baking chamber, and a plurality of spaced horizontal tube-type radiating heaters interposed between said air chambers and said conveyer and extending in a direction substantially parallel to the run of the conveyer for substantially the entire length thereof, the opposite ends of said heaters being connected to said headers, the spacing between the axes of said rows of orifices being less than the spacing between the longitudinal axes of said heaters whereby the majority of orifices in alternate rows are located to coincide with the spaces between the adjoining heaters.

11. In an oven provided with a baking chamber having a traveling conveyer, a plurality of air chambers in said baking chamber disposed above and below said conveyer in spaced relation thereto and extending for substantially the entire area of the run of the conveyer, each of said air chambers having an inner wall provided with a plurality of spaced orifices arranged in aligned rows extending generally in the direction of the run of said conveyer but inclined in the horizontal plane in relation to said direction, the rows above said conveyor being oppositely aligned with respect to the rows below said conveyor, conduit means including a blower connecting said baking chamber with said air chambers, means for proportioning the flow of air to each of said air chambers, a plurality of headers extending transversely of said baking chamber, and a plurality of spaced horizontal tube-type radiating heaters interposed between said air chambers and said conveyer and extending in a direction substantially parallel to the run of the conveyer, the opposite ends of said heaters being connected to said headers, the spacing between the axes of said rows being less than the spacing between the longitudinal axes of said heaters whereby the majority of orifices in alternate rows are located to coincide with the spaces between adjoining heaters.

12. In an oven provided with a baking chamber having a traveling conveyer, a plurality of air chambers in said baking chamber disposed above and below said conveyer in spaced relation thereto and extending for substantially the entire area of the run of the conveyer, each of said air chambers having an inner wall provided with a plurality of spaced orifices arranged in aligned rows extending generally in the direction of the run of the conveyer but inclined in the horizontal plane in relation to said direction, the rows above said conveyer oppositely inclined with respect to the rows below said conveyer, conduit means including a blower connecting said baking chamber with said air chambers, means for proportioning the flow of air to each of said air chambers, a plurality of headers extending transversely of said baking chamber, and a plurality of spaced horizontal tube-type radiating heaters interposed between said air chambers and said conveyer and extending in a direction substantially parallel to the run of the conveyer for substantially the entire length thereof, the opposite end portions of said heaters terminating within said baking chamber and being connected to said headers, said rows of orifices being spaced whereby at least some of the air discharged from said baking chambers is discharged between said heaters.

References Cited in the file of this patent

UNITED STATES PATENTS

| | | |
|---|---|---|
| 1,436,037 | Heliot | Nov. 21, 1922 |
| 1,641,313 | Bonaparte | Sept. 6, 1927 |
| 1,829,670 | Reese | Oct. 27, 1931 |
| 1,971,766 | Byron et al. | Aug. 28, 1934 |
| 2,286,049 | Baker | June 9, 1942 |
| 2,568,695 | Bailey | Sept. 25, 1951 |
| 2,575,291 | Owen | Nov. 13, 1951 |

FOREIGN PATENTS

| | | |
|---|---|---|
| 94,439 | Germany | Oct. 2, 1897 |
| 965,635 | France | Sept. 18, 1950 |